United States Patent [19]
Glock et al.
[11] 3,729,721
[45] Apr. 24, 1973

[54] CIRCUIT ARRANGEMENT FOR READING AND WRITING IN A BIPOLAR SEMICONDUCTOR MEMORY

[75] Inventors: Hans Glock, Odelzhausen; Herbert Ernst, Munich, both of Germany

[73] Assignee: Siemens Aktiengesellschaft, Berlin and Munich, Germany

[22] Filed: Aug. 18, 1971

[21] Appl. No.: 172,821

[30] Foreign Application Priority Data

Sept. 23, 1970 Germany....................P 20 46 929.8

[52] U.S. Cl.............................340/173 FF, 307/238
[51] Int. Cl.............................................G11c 11/40
[58] Field of Search..................340/173 FF; 307/238

[56] References Cited

UNITED STATES PATENTS

| | | | |
|---|---|---|---|
| 3,636,377 | 1/1972 | Economopoulos | 340/173 FF |
| 3,436,738 | 4/1969 | Martin | 340/173 FF |
| 3,537,078 | 10/1970 | Pomeranz | 340/173 FF |
| 3,553,659 | 1/1971 | Englund | 340/173 FF |
| 3,618,052 | 11/1971 | Kwei | 340/173 FF |
| 3,634,833 | 1/1972 | Dunn | 340/173 FF |

*Primary Examiner*—Stanley M. Urynowicz, Jr.
*Attorney*—Carlton Hill et al.

[57] ABSTRACT

A circuit arrangement for reading and writing in a bipolar semiconductor memory whose memory cells are arranged in a memory matrix and comprise two multi-emitter transistors connected by way of an emitter of each to a selective conductor and by way of a second emitter of each to bit conductors and whose collectors are in each case connected with the base of the other multi-emitter transistor and a collector resistance, wherein the collector resistances of the memory cells of a matrix are jointly collected to a fixed voltage, a first data amplifier includes a pair of transistors arranged for matrix selection between the bit conductors and a first operating voltage by which in a nonselected condition the bit conductors are switched to a currentless condition, and an X-address amplifier including transistor switches which are connected to the selective conductors which, in the rest condition of the memory matrix, the voltage at the emitters of the multi-emitter transistors connected to the selective conductors is reduced to such an extent that only a residual current flows through the address amplifier.

9 Claims, 1 Drawing Figure

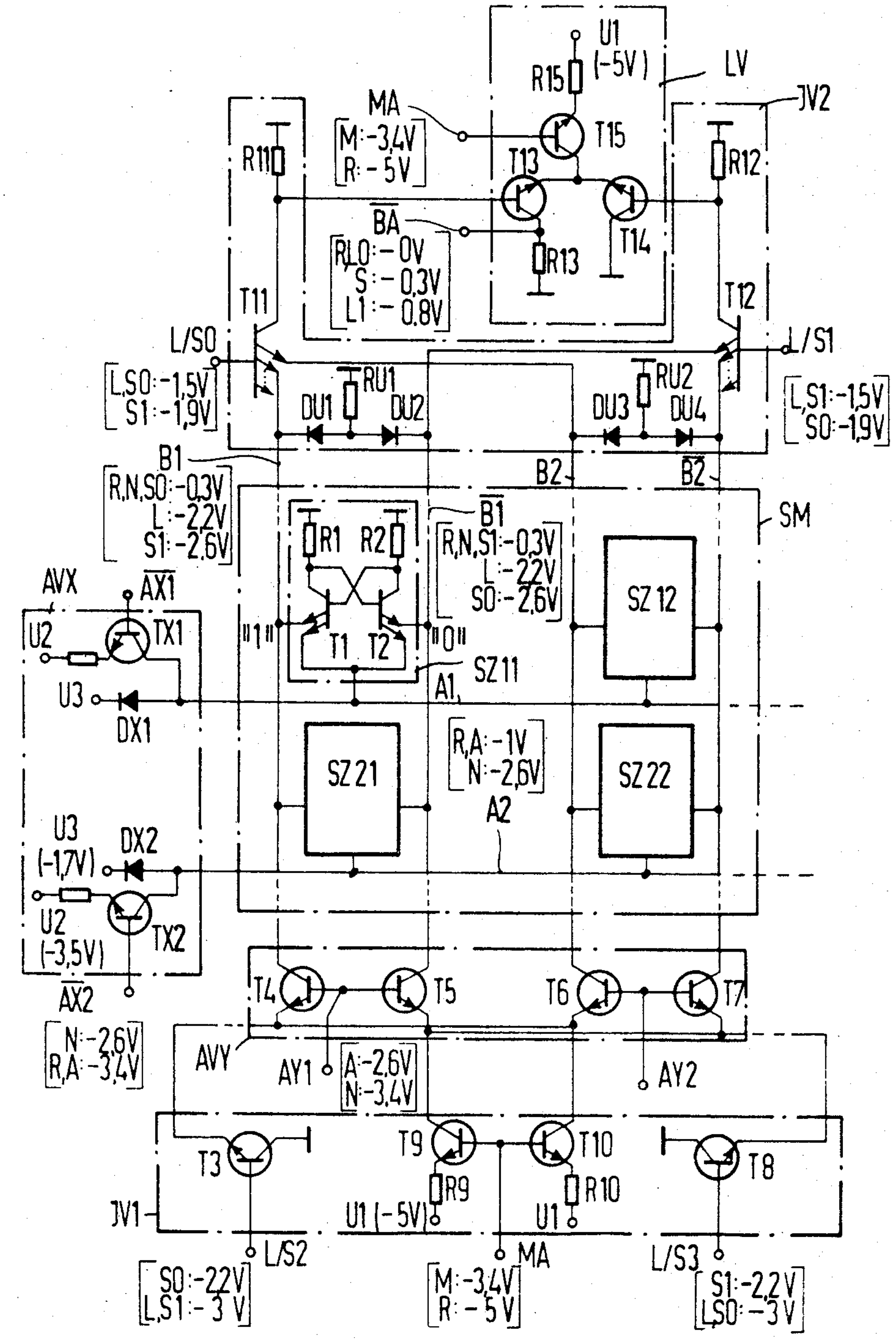
*INVENTORS*
*Hans Glock*
*Herbert Ernst*
BY Hill, Sherman, Meroni, Gross & Simpson ATTYS.

CIRCUIT ARRANGEMENT FOR READING AND WRITING IN A BIPOLAR SEMICONDUCTOR MEMORY

DESCRIPTION

This invention relates to a circuit arrangement for a bipolar semiconductor memory whose memory cells are arranged in memory matrices and comprise two multi-emitter transistors which are connected via one emitter of each to a selective conductor and via a second emitter of each to bit conductors and whose collectors are connected with the base of the other multi-emitter transistor and a collector resistance.

Lower cycle times are attainable with monolithic semiconductor memories constructed in accordance with the flip flop principle than is attainable in magnetic memories. In designing such operating memories with a capacity of several Mega Bytes, however, the high power loss in a rest condition is one of the principle problems encountered, particularly because of the required packing density. This power loss is attributable to the fact that in larger memory systems only relatively few memory cells are selected simultaneously, so that the power loss of the memory cells at rest is a key factor for the total power consumption.

This power consumption problem is discussed in an article by Michael Canning, "Active Memory Calls for Discretion" (Electronics, Feb. 20, 1967, pages 143 to 154). The manner of operation of bipolar semiconductor memory cells is discussed in that article, which cells are constructed from two multi-emitter transistors. The collectors of these transistors are connected to a positive supply potential by way of a single collector resistance and each collector is additionally connected to the base of the other transistor. One of the two pairs of emitters of the multi-emitter transistors is intercoupled and connected to a selection conductor. The second emitter is connected in each case to a bit conductor. One of the two multi-emitter transistors carries the memory cell current in each case as a function of the data stored therein. In a nonselected condition of the memory cell, the cell current flows by way of the emitter connected to the selection conductor. To read the data out of a memory cell, the cell current is switched to the emitter of the conductive transistor which is connected to the bit conductor. The memory is therefore separated from the bit conductors in a nonselected condition. As a result of the potential, negative in this case, at the selection conductors, the power loss in a nonselected conditions is higher than in the case of selection.

In order to solve this problem, a selection circuit is described in the article cited above in which the memory cell voltage for a nonselected cell is reduced by way of the supply conductor. Although at the same time the power loss of the nonselected memory cells can be reduced, this gain is reduced considerably, however, by the additional power loss of the approach circuit for the power supply conductor.

The present invention therefore has as its primary objective the creation of a circuit arrangement for reading and writing in a bipolar semiconductor memory system wherein the power loss of memory cells at rest, and at the same time that of the read-write arrangement, is as low as possible. In addition, it should be possible to reduce the memory cell voltage in the rest position to the border of the stability of the memory cell, which is at approximately one volt of cell voltage, without major rest currents flowing into the read-write arrangement connected to the memory cells.

According to the present invention, a memory system has a matrix of memory cells, which cells consist of two multi-emitter transistors, which transistors are connected by way of one emitter each to a selection line and by way of a second emitter each to bit conductors. The collectors of each transistor are connected to the base of the other transistor and to a collector resistance. A particular feature of the invention is that the aforementioned power loss problem is solved in that the collector resistances of the memory cells are jointly connected to a fixed voltage, that a first data amplifier is provided in which transistors are arranged for matrix selection between the bit conductors and a first operating voltage by which in a nonselected condition of the memory matrix the bit conductors are switched to a currentless condition, and that an X-address amplifier is provided in which transistor switches are connected to the selection conductors by which, in the rest position of the memory, the voltage at the emitters of the multi-emitter transistors is reduced to such an extent that only a residual current flows through the X-address amplifier. In a circuit arrangement according to the present invention, and in contrast to the solutions offered by the prior art, the supply line is therefore connected to a fixed voltage. The memory cell voltage at one memory cell is reduced to such an extent that the stability of the memory cell is still assured. The bit conductors are switched to a currentless condition in the rest state because the rest current in the selection conductors,and thus of the approach circuit of the power supply, also moves toward zero. This action signifies a substantially lower rest power loss in comparison with the semiconductor memories of the prior art.

The advantage of the low rest power loss of the entire memory including the corresponding read and write system becomes particularly clear in an improvement of the invention which resides in that in the X-address amplifier associated with the memory matrix, each selection conductor is connected by way of the collector-emitter path of one of the transistors for line selection, and an emitter resistance to a negative second operating voltage and by way of a switch diode poled in the pass direction to a third operating voltage more positive with respect to the first operating voltage. By selecting the value of this operating voltage, a control is offered for so dimensioning the voltage at the selection conductors in the rest position of the memory matrix that the smallest, yet still admissible, memory cell current is obtained. Moreover, it is assured thereby that in the entire circuit arrangement for reading and writing only the sum total of these absolutely necessary rest currents flows. This concept is particularly appropriate for a memory organized bitwise where in each case only one bit is selected from one of the memory matrices so that reading and writing amplifiers can be consolidated and arranged together with the memory cells on a memory chip. Thus, with a simple topography and low space requirements which are favorable for integration, the high packing density demanded by high cycle sequences may be obtained.

Other objects, features and advantages of the invention, its organization, construction and operation will be best understood from the following detailed description of a preferred embodiment thereof taken in conjunction with the accompanying drawing which is a schematic circuit diagram of a circuit arrangement for reading and writing in a bipolar semiconductor memory constructed in accordance with the principles of the present invention.

The drawing represents, in a simplified manner, a memory matrix SM with four identically designed memory cells SZ11-SZ22. This simplified representation is offered for greater clarity, but changes nothing in the basic function of such a memory matrix SM which in a practical application would include a substantially larger number of memory cells SZ. The structure of a memory cell is illustrated in the drawing by the example of the memory cell SZ11. The memory cell SZ11 comprises two multi-emitter transistors T1 and T2, whose collectors are each connected to ground by way of respective resistors R1, R2. Each collector is also connected to the base of the other transistor. The multi-emitter transistors T1 and T2 have, in this particular embodiment, two emitters each, of which one emitter is connected to one of the two bit conductors B1 or $\overline{B1}$ associated with the memory cell SZ11. The other pair of emitters of the two multi-emitter transistors T1 and T2 is intercoupled and connected to a selection conductor, selection conductor A1 in this particular case. The operating condition of both multi-emitter transistors T1 and/or T2 is a function of the data stored in the memory cell SZ11. In the present embodiment, it is defined that the multi-emitter transistor T1 is controlled to be conductive when the information "1" is stored and/or the second multi-emitter transistor is conductive when the data "0" is introduced into the memory cell SZ11.

The outputs of an X-address amplifier AVX are connected to the selection conductors A1 and A2 of the memory matrix SM. Address switches comprise, for example, a transistor TX1 and/or TX2 for line selection whose collector in each case is connected to the selection conductor A1 and A2, respectively, and whose emitter is connected to a second operating voltage U2 via an emitter resistance, the second operating voltage in this embodiment being −3.5 volts. The address switches are associated in this X-address amplifier AVX with each selection conductor A1 and A2, respectively. Switch diodes DX1 and DX2 are connected to the respective selection conductors A1 and A2, which diodes are poled in the pass direction and applied to a third operating voltage U3, which in this embodiment is −1.7 volts. In order to carry out line selection, the bases of the transistors TX1 and TX2 are connected to respective ones of the inputs $\overline{AX1}$ and $\overline{AX2}$ of the X-address amplifier AVX.

The column selection in the memory matrix SM is carried out in a Y-address amplifier AVY connected to the bit conductors B1, $\overline{B1}$ and B2, $\overline{B2}$. For selection purposes, one of the transistors T4, T5, T6 and T7 for column selection is associated in this Y-address amplifier AVY to a respective one of the bit conductors B1, $\overline{B1}$, B2, $\overline{B2}$. These transistors T4–T7 are connected with their respective collectors connected to the bit conductors B1, $\overline{B1}$, B2 and $\overline{B2}$, whereby the transistors associated with the bit conductors of a memory column, for example, the transistors T4 and T5 associated with the bit conductors B1 and $\overline{B1}$ are coupled with each other via their bases and connected to signal inputs AY1 and AY2 of the Y-address amplifier. The transistors of the Y-address amplifier AVY connected to the bit conductors, for example, bit conductors B1 and B2, which correspond to each other in the different columns of the memory matrix, are interconnected by way of their emitters and jointly connected to one of the outputs of a first data amplifier IV1.

The first data amplifier IV1 contains, first of all, two transistors T9 and T10 coupled by way of their bases for matrix selection at an input MA. The collectors of these transistors are connected to the two mentioned outputs of the first data amplifier IV1 and their emitters are connected by way of respective emitter resistances R9, R10 to a first negative operating voltage U1. The operating voltage U1 in this particular embodiment is −5 volts. The base connections of the transistors T9 and T10, as mentioned above, are jointly connected to a first signal input MA of the first data amplifier IV1. In addition, this first data amplifier IV1 has two additional transistors T3 and T8, whose collectors are grounded in each case to one of the two outputs of the first amplifier IV1. The base connections of these transistors T3, T8 are connected with a second signal input L/S2 and a third signal input L/S3 of the first data amplifier IV1, respectively.

A second data amplifier IV2 is associated with the bit conductors B1, $\overline{B1}$, B2 and $\overline{B2}$, respectively. The second data amplifier IV2 contains two additional multi-emitter transistors T11 and T12, whose emitters in each case are so connected to one of the bit conductors B1 or B2 and $\overline{B1}$ or $\overline{B2}$ that in each case one of the two multi-emitter transistors T1 or T2 of the memory cells SZ is associated with one of the two multi-emitter transistors T11 or T12 of the second data amplifier IV2. Or, expressed in a different manner, one of the bit conductors B1 or B2 and $\overline{B1}$ or $\overline{B2}$ of a memory column of the memory matrix SM is connected to the emitters of one of the multi-emitter transistors T11 or T12 of the second data amplifier IV2. The collectors of these additional multi-emitter transistors T11, T12 are grounded by way of respective collector resistors R11, R12 and also connected by way of a respective signal output of the second data amplifier IV2 to one of the two reading signal inputs of a reading amplifier LV. The base connections of both multi-emitter transistors T11 and T12 in each case are connected to one of the reading/writing inputs L/S0 and L/S1 of the second data amplifier IV2. In addition, the second data amplifier IV2 also contains transfer diodes DU1–DU4. These transfer diodes are connected in pairs, for example, DU1 and DU2 with each other at their anodes and jointly grounded by way of a transfer resistance RU1, RU2, respectively, while the cathodes of a coupled diode pair (DU1 and DU2, DU3 and DU4) are connected to one of the bit conductors B1, $\overline{B1}$, B2 or $\overline{B2}$.

As already mentioned above, a reading amplifier LV is connected to the outputs of the second data amplifier IV2. It contains two emitter coupled reading amplifier transistors T13 and T14 whose base connections are connected to the reading signal inputs of the reading amplifier LV. The collector of the one reading amplifier transistor T13 is grounded by way of a collector resistance R13, while the collector of the second reading amplifier transistor T14 is grounded directly. The coupled emitters of these transistors are connected by way of the collector-emitter path of an additional transistor T15 and its emitter resistance R15 to the first negative operating voltage which, as mentioned above, is −5 volts in this particular embodiment. The base of the additional transistor T15 is associated with the additional signal input MA of the reading amplifier LV by way of which the reading amplifier is blocked in the rest position of the memory matrix SM.

While the FIGURE illustrates only one storage matrix SM, and in a highly simplified manner at that, larger memory systems comprise a multiplicity of such memory matrices with address amplifiers AVX and AVY and data amplifiers IV1 and IV2 and a reading amplifier LV being associated with said matrices.

The manner of operation of the circuit arrangement described in the foregoing will be set forth below in more detail.

For a better understanding of the circuit arrangement represented in the drawing, examples are provides for voltages at the signal inputs of the amplifiers and at the selection conductors and/or bit conductors for the individual operating conditions in rectangular brackets. In this connection, the following symbols are employed:

M for the selected condition of the memory matrix SM
R for the rest condition of the memory matrix SM
A for a selected address and/or the selected condition of the corresponding memory cell SZ
N for a nonselected address and/or memory cell
L (1.0) for reading a data "1" or "0"
S (1.0) for writing a data "1" or "0"

First, the nonselected condition of the memory cell SM, that is its rest condition, shall be discussed, in which none of the memory cells SZ11–SZ22 is selected. The power and voltage conditions in the memory matrix SM and/or in the memory cells SZ11–SZ22 are determined in this case by the rest signals R at the first signal input MA of the first data amplifier IV1 and at the signal inputs $\overline{AX1}$ and $\overline{AX2}$ of the X-address amplifier AVX. The first signal input MA of the first data amplifier IV1 is placed in this case at −5 volts, while the signal inputs $\overline{AX1}$, $\overline{AX2}$ of the X-address amplifier AVX is supplied with a rest signal R = −3.4 volts. The two transistors T9 and T10 coupled by way of their bases are blocked for matrix selection by the rest signal furnished to the first signal input MA of the first data amplifier IV1 so that the bit conductors B1, $\overline{B1}$ and B2, $\overline{B2}$ are connected without current flow therethrough and recharged by the recharge resistance RU1 and the recharge diodes DU3 and DU4 with the recharge resistance RU2. During this recharge operation, both bit conductors of a bit column, for example, B1 and $\overline{B1}$ must always carry the same potential in order to avoid destruction of the information of the corresponding memory cells, here cells SZ11 and SZ21. The current flowing through the recharge resistance RU1 and the recharge resistance RU2 is distributed, depending on the potential of the connected bit conductors, for example, B1 and $\overline{B1}$ is distributed differentially to the recharge diodes DU1 and DU2.

At the same time the signal inputs $\overline{AX1}$ and $\overline{AX2}$ of the X-address amplifier are fed to the more negative rest signal R = −3.4 volts so that the transistors TX1 and TX2 are blocked for line selection. Then the switch diodes DX1, DX2 may conduct, which diodes are connected to the selection conductors A1 and A2 and switch the third operating voltage U3 through to the selection conductors. In considering the passage voltage of the switch diodes DX1 and DX2, a reset signal R = −1 volt result for the rest condition on the selection conductors A1 and A2. This voltage is identical with the prevailing memory cell voltage so that the cell current is furnished by way of the emitter of the just conductive multi-emitter transistor T1, T2 connected to the selection conductor A1, A2, to a memory cell SZ. Thus, the entire power consumption of the circuit is restricted to the rest power loss of the memory cells SZ and the power loss of the switch diodes DX1 and DX2 because the reading amplifier LV is still disconnected by way of its additional signal input MA and by way of the rest signal R= −5 volts. To explain the reading process, it is assumed that the data "1" stored in the memory cell SZ11 is to be read and that the conductive condition of the first multi-emitter transistor T1 corresponds to this stored data. During the reading and writing operations in the memory matrix SM, the matrix selection signal M = −3.4 volts, which is more positive with respect to the rest signal R, is applied at the first signal input MA of the first data amplifier IV1. Consequently, both transistors T9 and T10 become conductive for matrix selection. During the reading process, reading signals L = − 3.4 volts are fed to the second and third signal inputs L/S2 and L/S3 so that the transistors T3 and T8 remain blocked.

At the same time, a selection signal A = −2.6 volts is supplied by way of the one signal input AY1 of the Y-address amplifier AVY to the two differential amplifiers T4 and T5 for column selection, which signal is more positive than in the nonselected condition. Thus, these two transistors also become conductive and the bit conductors B1 and $\overline{B1}$ of the selected memory column are supplied with currents for matrix selection by way of the transistors T9 and T10.

Both multi-emitter transistors T11 and T12 of the second data amplifier IV2 are conductively controlled by way of the reading signals L furnished to the read-write inputs L/S0 and L/S1 and maintain the current carrying bit conductors B1 and $\overline{B1}$ at the same potential (L = −2.2 volts).

The X-address signal at the first signal input $\overline{AX1}$ remains unchanged under the selection (R = A = −3.4 volts) and thus the potential on the selection conductor A1 which is connected to the selected memory cell SZ11 also corresponds to the rest potential of −1 volt. This is indicated in the drawing by the reference symbol A = −1 volt. The remaining selection conductors, of which the drawing only shows the second selection conductor A2, are switched on the other hand to a more negative potential N = −2.6 volts. For that purpose, the transistors for line selection are not connected to the nonaddressed selection conductor A2, in this case the transistor TX2, and are controlled to be conducted by a more positive signal N. Consequently, the more negative second operating voltage U2 is connected to the selection conductor A2 by way of the emitter resistance of the transistor TX2.

The selection signals cause only the selected memory cell SZ11 to be connected within a column of the memory matrix SM and the bit conductors, in this case B1 and $\overline{B1}$, because only in that memory cell is the cell current switched by the emitter of the conductive multi-emitter transistor T1 which has its emitters connected to the selection conductor A1 and to the bit conductor B1.

In addition, under this selection, a connection from the first data amplifier IV1 to the second data amplifier IV2 and the reading amplifier LV only exists in the selected column. The currents impressed by way of the transistors T9 and T10 for the matrix selection thus flow in the same magnitude, except base and blocking currents, exclusively through the selected bit conductors B1 and $\overline{B1}$. Up to the collector resistances R11 and R12 in the second data amplifier IV2, which at the same time represent the input resistances of the reading amplifier LV, these impressed currents are reduced only by the currents through the recharge circuits DU1, DU2, and RU1, and, depending on the data of the selected memory cell, by the cell current on one of the bit conductors. The differential signal at the inputs of the reading amplifier LV thus results from the product of the cell current times input resistance R11 and R12 of the reading amplifier LV.

If, as assumed, a "1" is stored in the memory cell SZ11 and if the additional transistor T15 is rendered conductive by a selective signal M at the corresponding signal input MA, the differential signal conductively controlls the first reading amplifier transistor T13, while the second reading amplifier transistor T14 is blocked. Therefore, the bit output signal $\overline{BA}$ of the reading amplifier LV is negative (L1 = 0.8 volts). One advantage of this reading method resides in that both bit conductors are placed at the same potential so that a destruction-free reading may be provided. The reading of the stored data is accomplished exclusively by current switching between the memory cell SZ11 and the input of the reading amplifier LV.

The selection of a memory cell for the writing operation is done in a manner similar to that for the reading operation, via the X and Y address amplifiers. Because of the more favorable investment for the approach and a slight overcoupling at adequate writing speed, a writing method is employed where on the one bit conductor a low negative writing impulse occurs and the current on the other bit conductor is disconnected.

This will be explained by way of an example where the data bit "1" is to be entered into the memory cell SZ11. One of the two read-write inputs L/S1 of the second data amplifier IV2 which is associated by way of the second multi-emitter transistor T12 with the bit conductor $\overline{B1}$, maintains its potential in comparison with the reading operation just described, while the potential at the other read-write input L/S0 is reduced by 0.4 volts to S1 = −1.9 volts. Consequently, the potential at the bit conductor B1 can drop by way of the multi-emitter transistor T11 of the second data amplifier IV2 to −2.6 volts. At the same time the other bit conductor $\overline{B1}$ is connected without current flow by way of the transistor T8 to the third signal input L/S3 of the first data amplifier IV1. In contrast to the unchanged potential at the second signal input L/S2, this third signal input L/S3 is provided with a more positive writing signal S2 = −2.2 volts. As a result, the memory cell current in the selected memory cell SZ11 is interrupted by way of the second multi-emitter transistor T2, thereby making sure that only the first multi-emitter transistor T1 carries the cell current by way of its emitter which is connected to the bit conductor B1. If the data bit "0" were to be recorded into the selected memory cell SZ11, the potentials of the read-write inputs L/S0 and L/S1 of the second data amplifier IV2 and of the signal inputs L/S2 and L/S3 of the first data amplifier IV1 would be changed accordingly.

Although the disconnection of the current in one of the bit conductors B1 or $\overline{B1}$ alone would cause the switching of the selected memory cell SZ11, the simultaneous reduction of the potential on the other bit conductor $\overline{B1}$ or B1 respectively, however, offers the advantage of a higher writing speed. The drop of the base potential of the multi-emitter transistor T11 or T12 of the second data amplifier IV2 associated with this bit conductor B1 or $\overline{B1}$ furthermore causes the amplifier to be blocked during the writing operation, because the rewritten memory cell SZ11 already completely takes over prior to reaching the writing potential of S1 = −2.6 volts at the bit conductor B1 or $\overline{B1}$ of the impressed current, with the exception of the current flowing through the recharge circuit DU1 or DU2 and RU1. However, the result is that only the very low base currents of the reading amplifier transistors T13 and T14 flow through the collector resistors R11 and R12 of the multi-emitter transistors T11 and T12. With this approach for the reading amplifier LV, the collector resistor R13 of the one reading amplifier transistor T13 reduces its current amplification in relation to the second reading amplifier transistor T14 so that a preferential condition is achieved for the bit output $\overline{BA}$ of the reading amplifier LV which leads to reduced writing disturbance and a short writing recovery time.

Although a particular embodiment was described above, the invention is not limited thereto. Rather, within the scope of the invention, additional designs are quite possible. One example would be a memory cell constructed with two multi-emitter transistors having three emitters in each case, of which, like in the embodiment described, one emitter in each case is connected to the bit conductors, the second is connected to a selection conductor and the third is connected to a supply conductor for determining the rest condition of the memory cell and maintained at a fixed potential. In the potential selected, this supply voltage would be −1 volt in the embodiment described. Then the switch diodes in the X-address amplifier could be eliminated and the rest power loss could be further reduced. This would be offset by a certain disadvantage in that the cell surface for a memory cell would be enlarged by 10 percent. This contradicts one of the demands for integration so that the pros and cons must be weighed for each practical application.

In the description of the embodiment above, it was further assumed that the address part and the information part are integrated jointly as one chip. This offers the advantage of shorter operation times and better interference distances, attainable at steeper leaving and trailing edges. In matters of production technique, fewer chip types are then needed, which moreover require a lower number of inputs and outputs. One advantage of such a full integration, however, which slowly balances only with increasing chip capacity, is the larger number of building components per chip as otherwise more memory cells are generally associated with a separate address and data portion. That is why it would be quite advantageous to do away with memory chips which comprise only a relatively small number of bits, in order to have complete integration with an internal address and data part.

Many other changes and modifications of our invention may become apparent to those skilled in the art without departing from the spirit and scope thereof, and it is to be understood that we intend to include within the patent warranted hereon all such changes and modifications as may reasonably and properly be included within the scope of our contribution to the art.

What we claim as our invention is:

1. A circuit arrangement for reading and writing in a bipolar semiconductor memory including a matrix of selection conductors and bit conductors and a plurality of memory cells arranged in the matrix, each cell including a pair of multi-emitter transistors, each transistor having a first emitter connected to the like emitter of the other transistor and to a selection conductor and a second emitter connected to respective bit conductors, a collector, and a base, said collector connected to the base of the other transistor and to a collector resistance, comprising: means connecting said collector resistances to the same fixed supply potential, a data amplifier including a pair of transistors connected between respective ones of said bit conductors and a first operating potential by which non-selected bit conductors are switched to a currentless condition or switched to a currentless condition, and an address amplifier including a pair of transistor switches connected between respective selection conductors and a second operating voltage by which, in the rest position of the matrix, the voltage at the emitters of the multi-emitter transistors connected to said selection conductors is reduced to such an extent that only a residual current flows through said address amplifier, each of said transistor switches of said address amplifier including a collector-emitter path connected between the second operating potential and the corresponding selection conductor, a resistor interposed in said path between the second operating potential and said transistor, and a switch diode poled in the pass direction and connected between the corresponding selection conductor and a third operating potential which is more positive than the second operating potential.

2. A circuit arrangement for reading and writing in a bipolar semiconductor memory including a matrix of selection conductors and bit conductors and a plurality of memory cells arranged in the matrix, each cell including a pair of multi-emitter transistors, each transistor having a first emitter connected to the like emitter of the other transistor and to a selection conductor and a second emitter connected to respective bit conductors, a collector, and a base, said collector connected to the base of the other transistor and to a collector resistance, comprising: means connecting said collector resistances to the same fixed supply potential, a data amplifier including a pair of transistors connected between respective ones of said bit conductors and a first operating potential by which non-selected bit conductors are switched to a currentless condition or switched to a currentless condition, and an address amplifier including a pair of transistor switches connected between respective selection conductors and a second operating voltage by which, in the rest position of the matrix, the voltage at the emitters of the multi-emitter transistors connected to said selection conductors is reduced to such an extent that only a residual current flows through said address amplifier, said transistors of said data amplifier each including a collector, a base and an emitter, said collector connected to a corresponding bit conductor, said emitter connected to the first operating potential, an emitter resistance interposed between said emitter and said first operating potential, and said base connected to the like base of the other said transistor and jointly connected therewith to a first signal input for receiving a rest signal to be blocked in the resting condition of said matrix.

3. A circuit arrangement for reading and writing in a bipolar semiconductor memory including a matrix of selection conductors and a bit conductors and a plurality of memory cells arranged in the matrix, each cell including a pair of multi-emitter transistors, each transistor having a first emitter connected to the like emitter of the other transistor and to a selection conductor and a second emitter connected to respective bit conductors, a collector, and a base, said collector connected to the base of the other transistor and to a collector resistance, comprising: means connecting said collector resistances to the same fixed supply potential, a data amplifier including a pair of transistors connected between respective ones of said bit conductors and a first operating potential by which non-selected bit conductors are switched to a currentless condition or switched to a currentless condition, and an address amplifier including a pair of transistor switches connected between respective selection conductors and a second operating voltage by which, in the rest position of the matrix, the voltage at the emitters of the multi-emitter transistors connected to said selection conductors is reduced to such an extent that only a residual current flows through said address amplifier, a plurality of recharged diodes each having an anode and a cathode, and each having its cathode connected to a corresponding bit conductor and its anode connected to ground, and a recharge resistance interposed between ground and anodes of adjacent ones of said recharged diodes.

4. A circuit arrangement for reading and writing in a bipolar semiconductor memory including a matrix of selection conductors and bit conductors and a plurality of memory cells arranged in the matrix, each cell including a pair of multi-emitter transistors, each transistor having a first emitter connected to the like emitter of the other transistor and to a selection condudtor and a second emitter connected to respective bit conductors, a collector, and a base, said collector connected to the base of the other transistor and to a collector resistance, comprising: means connecting said collector resistances to the same fixed supply potential, a data amplifier including a pair of transistors connected between respective ones of said bit conductors and a first operating potential by which non-selected bit conductors are switched to a currentless condition or switched to a currentless condition, and a first address amplifier including a pair of transistor switches connected between respective selection conductors and a second operating voltage by which, in the rest position of the matrix, the voltage at the emitters of the multi-emitter transistors connected to said selection conductors is reduced to such an extent that only a residual current flows through said first address amplifier, a second address amplifier for selection of a column of memory cells from the memory matrix, said second address amplifier interposed between said bit conductors and said data amplifier, said second address amplifier including a pair of transistors associated with the bit conductors connected to the same memory cells, each said transistor including a collector, an emitter and a base, said collector connected to a respective one of said bit conductors, said emitter connected to said data amplifier and said base connected to the like base of the other transistor for receiving a selection input signal.

5. A circuit arrangement for reading and writing in a bipolar semiconductor memory including a matrix of selection conductors and bit conductors and a plurality of memory cells arranged in the matrix, each cell including a pair of multi-emitter transistors, each transistor having a first emitter connected to the like emitter of the other transistor and to a selection conductor and a second emitter connected to respective bit conductors, a collector, and a base, said collector connected to the base of the other transistor and to a collector resistance, comprising: means connecting said collector resistances to the same fixed supply potential; a first data amplifier including a pair of transistors connected between respective ones of said bit conductors and a first operating potential by which nonselected bit conductors are switched to a currentless condition or switched to a currentless condition, and an address amplifier including a pair of transistor switches connected between respective selection conductors and a second operating voltage by which, in the rest position of the matrix, the voltage at the emitters of the multi-emitter transistors connected to said selection conductors is reduced to such an extent that only a residual current flows through said address amplifier, a second data amplifier connected to said bit conductors, said second data amplifier comprising a pair of multi-emitter transistors each having a collector, a base and a plurality of emitters, a collector resistance connecting said collector to ground, said base serving as a signal input, and said emitters connected to different ones of said bit conductors such that one of the multi-emitter transistors of said second data amplifier is associated with one of the multi-emitter transistors of said memory cells.

6. A circuit arrangement according to claim 5, comprising a reading amplifier including a pair of transistors each having a base, a collector, and an emitter, the base of each of said transistors connected to the collector of a respective one of said multi-emitter transistors of said second data amplifier, said emitters connected in common, an additional transistor having a collector emitter path connected to said commonly connected emitters, an emitter resistance connecting the collector emitter path of said additional transistor to the first operating potential, and means connecting the collectors of said transistors of said reading amplifier to ground, said means including different resistance values for the respective collectors, whereby the collector of one of the reading amplifier transistors is connected as the signal output of the reading amplifier.

7. A circuit arrangement according to claim 6, comprising means for controlling the conduction of the multi-emitter transistors of said second data amplifier during a reading operation.

8. A circuit arrangement according to claim 7, comprising a further transistor in the first data amplifier having an emitter, a collector and a base, its collector being grounded and its base being connected as a signal input for said first data amplifier, and its emitter connected to the collector of the first-mentioned transistors of said first data amplifier for matrix selection.

9. A circuit arrangement according to claim 8, comprising means for recording data in a selected memory cell by way of a bit conductor including means for reducing the voltage on the selected bit conductor in response to the application of a negative writing signal at said base of the associated multi-emitter transistor of the second data amplifier and the other bit conductor of the selected memory cell is therefore connected without current flow, the further transistor associated with said bit conductor in said first data amplifier rendered conductive by the application of an additional writing signal at its base.

* * * * *